(12) United States Patent
Patel

(10) Patent No.: US 8,199,704 B2
(45) Date of Patent: Jun. 12, 2012

(54) METHOD OF ENCODED CHANNEL ACQUISITION

(75) Inventor: Ashok C. Patel, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1013 days.

(21) Appl. No.: 10/551,422

(22) PCT Filed: Mar. 31, 2003

(86) PCT No.: PCT/CA03/00459
§ 371 (c)(1),
(2), (4) Date: Sep. 30, 2005

(87) PCT Pub. No.: WO2004/089015
PCT Pub. Date: Oct. 14, 2004

(65) Prior Publication Data
US 2006/0209753 A1    Sep. 21, 2006

(51) Int. Cl.
*H04W 4/00* (2009.01)
(52) U.S. Cl. ........ 370/329; 370/450; 370/451; 370/452; 455/448; 455/552.1
(58) Field of Classification Search .................. 370/329, 370/450–452.2; 455/552.1, 448
See application file for complete search history.

(56) References Cited

U.S. PATENT DOCUMENTS

| | | | | | |
|---|---|---|---|---|---|
| 5,258,981 | A | * | 11/1993 | Davey et al. | 370/311 |
| 5,465,388 | A | * | 11/1995 | Zicker | 455/404.1 |
| 5,966,657 | A | * | 10/1999 | Sporre | 455/425 |
| 6,052,590 | A | * | 4/2000 | Hicks et al. | 455/434 |
| 6,393,284 | B1 | * | 5/2002 | Dent | 455/434 |
| 6,400,948 | B1 | * | 6/2002 | Hardin | 455/434 |
| 2001/0046861 | A1 | | 11/2001 | Attimont et al. | |

FOREIGN PATENT DOCUMENTS

| | | |
|---|---|---|
| EP | 0486089 A2 | 5/1992 |
| EP | 0714217 A2 | 5/1996 |

OTHER PUBLICATIONS

International PCT Application No. PCT/CA2003/000459, Search Report dated Jan. 26, 2004.

* cited by examiner

*Primary Examiner* — Olumide T Ajibade Akonai
*Assistant Examiner* — Jaime Holliday
(74) *Attorney, Agent, or Firm* — Alexander Anishchenko; Borden Ladner Gervais LLP

(57) ABSTRACT

A method of scanning for an encoded signal, such as a GSM encoded signal, in a frequency band is disclosed herein. The disclosed method provides either more rapid acquisition of a signal, or increased battery life for mobile devices in regions without service. A corresponding mobile device that performs the method is also disclosed.

16 Claims, 8 Drawing Sheets

METHOD OF ENCODED CHANNEL ACQUISITION

FIELD OF THE INVENTION

The present invention relates generally to acquiring a communication network connection from an encoded signal. More particularly, the present invention relates to detecting encoded channels in a frequency band and obtaining a connection from a network related to the detected encoded channel.

BACKGROUND OF THE INVENTION

In the field of wireless communications, wireless mobile communication devices ("mobile devices") such as cellular phones, and personal digital assistants with integrated wireless communications, move from regions of service to regions without service. Additionally, mobile devices can be initialized in areas either with or without service. When a mobile device does not have service, it performs a signal acquisition scan to determine if there is a usable signal available. This acquisition scan typically scans the channels defined in a predetermined frequency band to determine which of the channels contain a signal that can be used to obtain service.

The plurality of channels defined in a frequency band are used to permit a plurality of service providers to offer cellular service. Typically, a frequency band is divided into 255 channels. Each service provider is typically allocated a number of channels in each frequency band so that it can situate a number of cellular service sites to create a series of overlapping coverage areas. Each cellular service site typically provides encoded signals on a number of distinct channels to allow for technologies such as frequency hopping.

Many mobile devices are compliant with the standards established through the Global System for Mobile Communications (GSM). In compliance with the GSM standard, conventional mobile devices sequentially scan all the channels in the allocated frequency band to create a list of the channels that contain GSM encoded signals. The channel with the highest signal power in the list that allows the mobile device to register with its associated network is used to provide the mobile device network connectivity. If there are no networks that offer the mobile device registration, the mobile device selects the channel with the highest signal power and registers for emergency service on the corresponding network. This network selection process is governed by a number of GSM standards, including GSM standard 5.08.

When a mobile device does not detect a channel with which it can register, it periodically rescans the channels to determine if service has become available. When a mobile device is in a region that does not offer service it typically consumes significant power, as the scanning process is a power intensive operation. Thus, a mobile device in a region without service will consume a great deal of power unless the time between scans is large in relation to the amount of time that the scan takes. Although increasing the time between scans increases battery life, it decreases the possibility that the user of the mobile device will be able obtain service as soon as it becomes available. Thus, designers of signal acquisition methods must design a tradeoff between battery power conservation and signal acquisition times.

It would, therefore, be advantageous for a mobile device to be able to offer both rapid discovery of available GSM channels and improved battery life while performing these channel scans.

SUMMARY OF THE INVENTION

A method of connecting a mobile device to a network having associated channels carrying encoded signals, according to an aspect of the present invention, comprises scanning selected subsets of channels until an encoded signal is identified in a channel, and establishing a connection between the mobile device and the network associated with the channel carrying the identified encoded signal.

In accordance with another aspect of the invention, a mobile device for connecting to an accessible wireless network transmitting an encoded signal in at least one of a plurality of channels in a frequency band, includes a transceiver, comprising a channel subset selector for selecting a subset of the channels in the frequency band and for controlling the transceiver to scan the channels in the selected subset, an encoded signal detector for identifying channels scanned by the transceiver carrying encoded signals, and a network device registrar for registering the mobile device on an accessible network associated with a channel carrying an identified encoded signal.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method of scanning channels in frequency bands to detect service while conserving battery life. As opposed to the conventional scanning of channels described above, a mobile device employing a method according to an aspect of the present invention scans channel subsets until a signal is found. While the following exemplary embodiments describe the invention with reference to compliance to the GSM standards, it will be understood by those skilled in the art that the techniques described herein can be used in any telecommunications standard employing channels.

Figure 1:
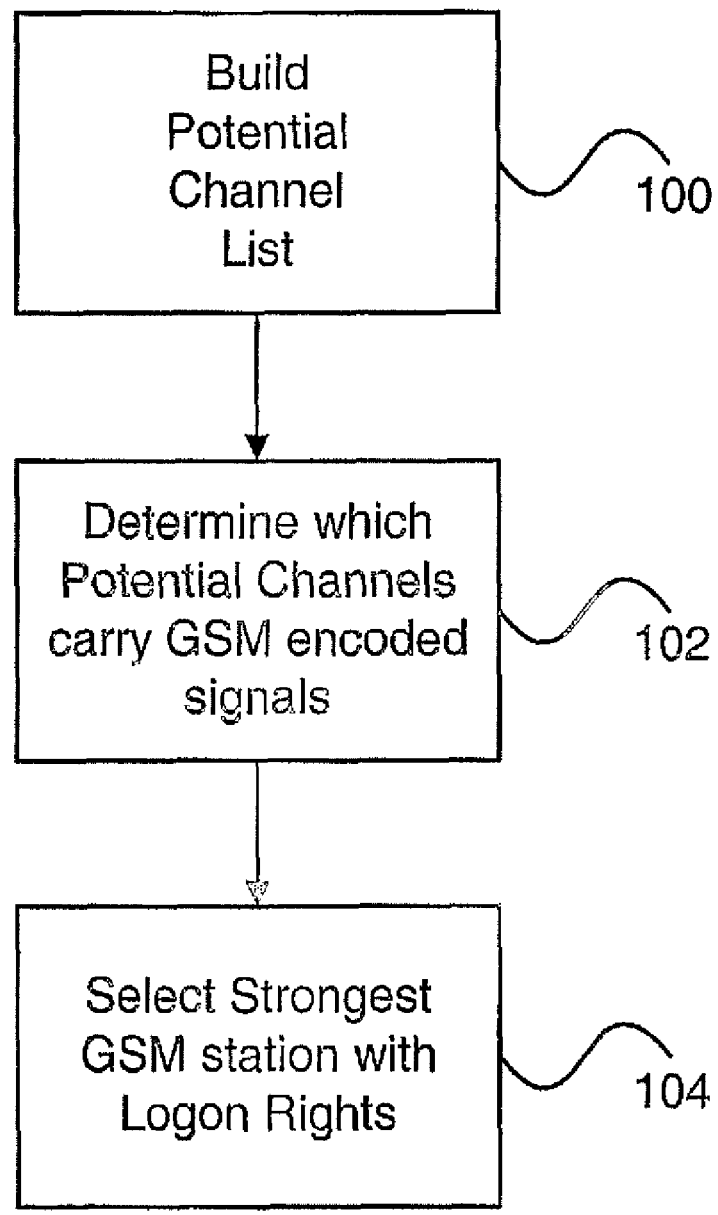
FIG. 1 is a flowchart illustrating a method of finding service.

In order to find the channel with the highest signal power that will offer the mobile device service, mobile devices are known to implement a frequency scanning method as illustrated in FIG. 1. When a mobile device is without service, it builds a potential channel list in step 100. The channels in the potential channel list are then scanned by the mobile device in step 102 to determine which channels in the potential channel list carry GSM encoded signals. This analysis results in a GSM channel list. In step 104, the mobile device selects the strongest channel associated with an accessible network with which to register or otherwise create a connection.

Figure 2:
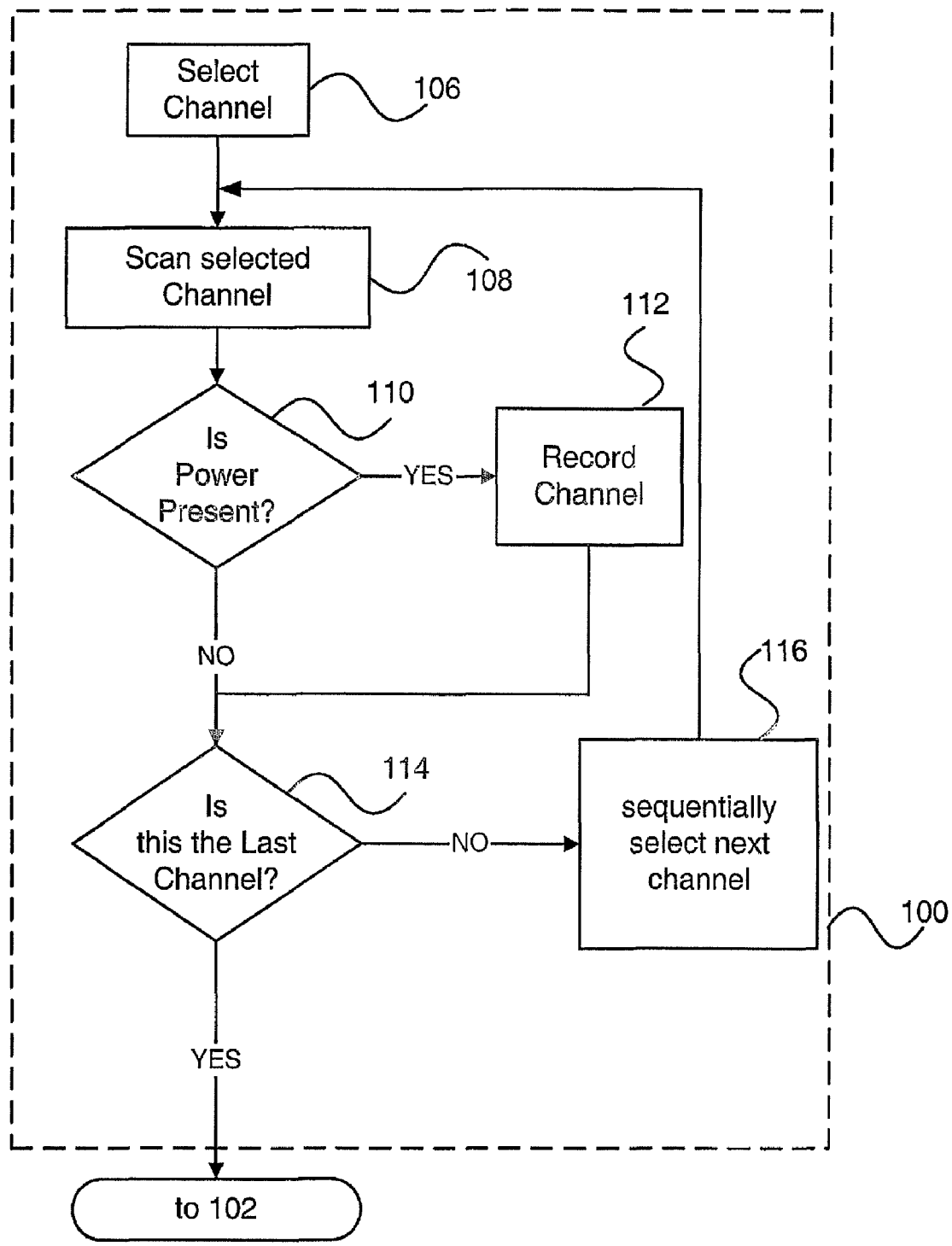
FIG. 2 is a flowchart illustrating a method of building a potential channel list.

To build a potential channel list in step 100, many mobile devices currently employ variations of the method illustrated in FIG. 2. In step 106, a channel is selected from the frequency band. In step 108, the selected channel is scanned to determine if the channel carries a signal with power exceeding a predetermined threshold. The determination of the power in a channel is made in step 110, and if sufficient power is present in the channel, the mobile device will record the channel information in a potential channel list in step 112. After recording the channel information in step 112 or determining in step 110 that a signal with sufficient power is not present, the mobile device proceeds to step 114, where a determination is made as to whether or not the most recently scanned channel is the last channel in the band. If the scanned channel is not the last channel in the frequency band, the mobile device sequentially selects the next channel in the frequency band in step 116. Upon selecting the next channel, the mobile device repeats the scanning process until the last channel in the frequency band is selected. When it is determined in step 114 that the scanned channel is the last channel in the frequency band, the recorded channel list is provided as the potential channel list for use in step 102.

Figure 3:
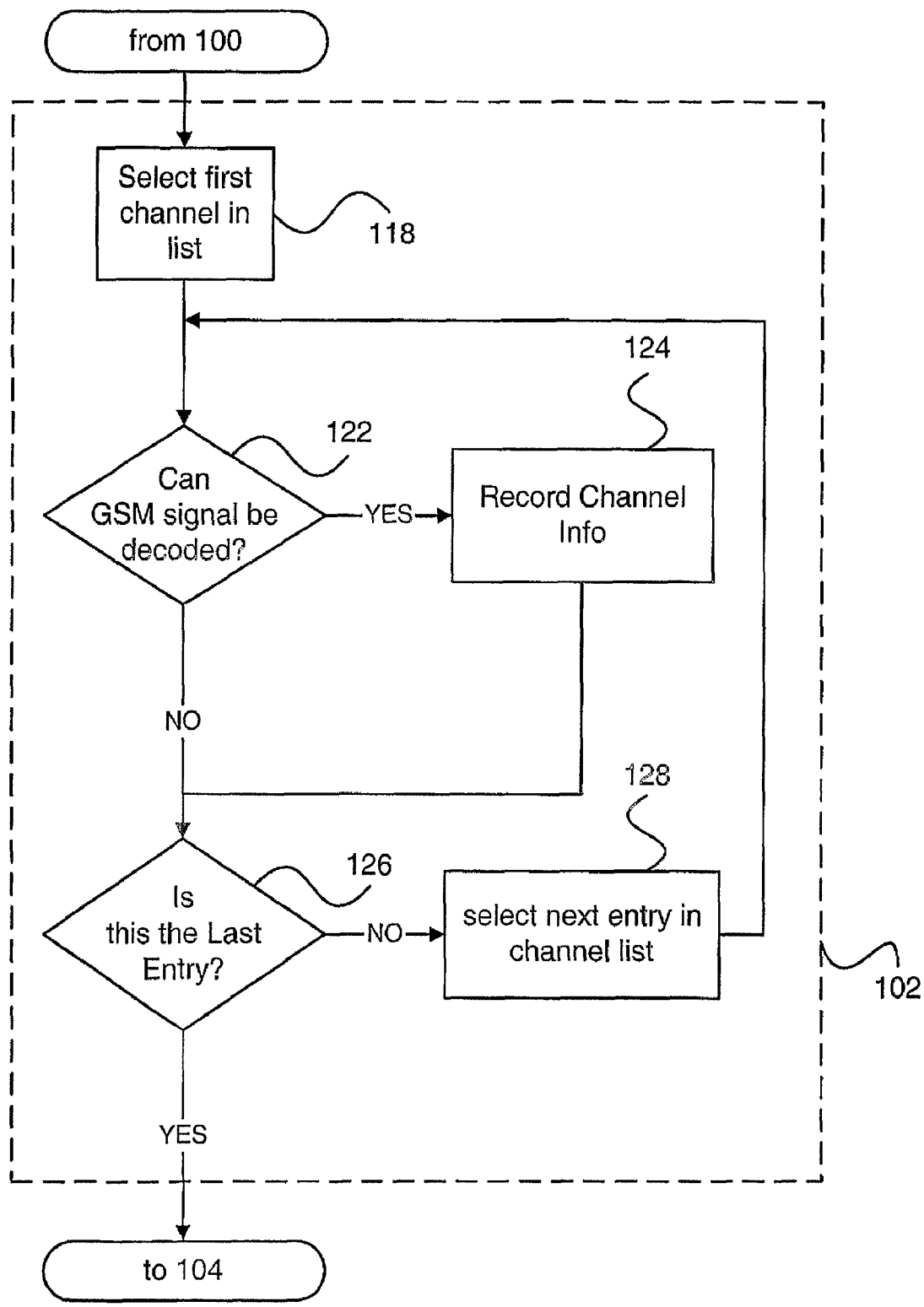
FIG. 3 is a flowchart illustrating a method of building a GSM channel list.

FIG. 3 illustrates a known method of determining which channels in the potential channel list contain GSM encoded signals. In step 118 the first channel in the potential channel list is selected. In step 122, the channel is analyzed to determine if it carries a GSM encoded signal. If the channel carries a GSM encoded signal, the channel information is recorded in a GSM channel list in step 124. Following the recording of the channel information, or if the signal is determined in step 122 to not contain a GSM encoded signal, the mobile device determines, in step 126, if the presently selected channel is the last entry in the potential channel list. If the entry is not the last entry in the potential channel list the next entry in the list is selected in step 128, and the analysis is repeated until all the channels in the entry list have been analyzed. When the last entry in the list has been analyzed the GSM channel list is created.

Figure 4:
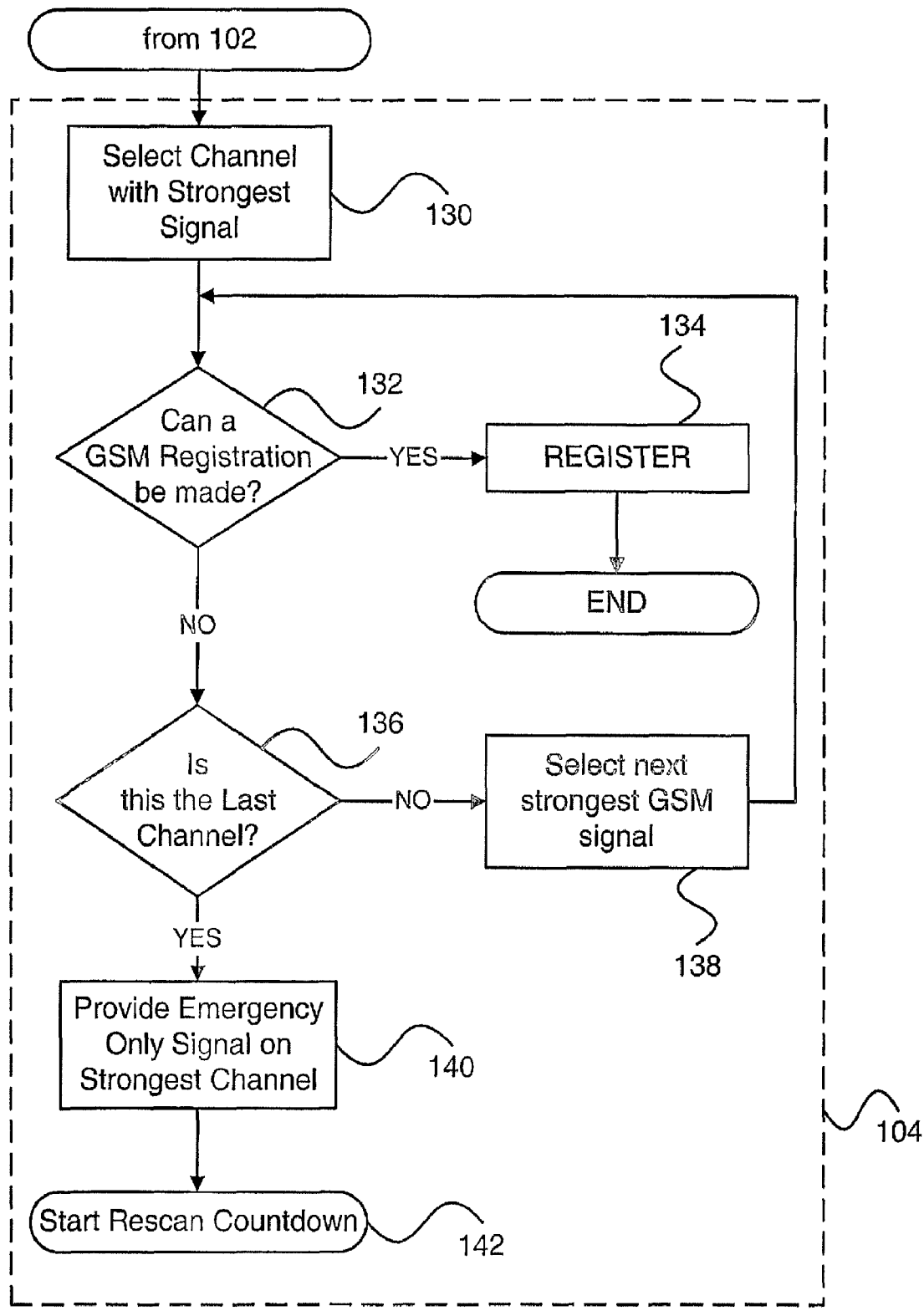
FIG. 4 is a flowchart illustrating a method of registering on a GSM channel from a GSM channel list.

FIG. 4 illustrates an exemplary method currently used by a variety of mobile devices to connect to a network associated with the channel carrying the strongest GSM encoded signal in accordance with step 104 of FIG. 1. The mobile device examines the GSM channel list and selects the channel carrying the strongest signal in step 130. The device then attempts to initiate registration of the mobile device with the GSM station providing that signal. If a GSM registration can be made in step 132, the mobile device registers with the GSM station in step 134 and the process ends. If registration cannot be made in step 132, the mobile device determines if the presently selected channel is the last channel in the GSM channel list. If the selected channel is not the last entry in the list the next most powerful signal is selected in step 138 and the registration process resumes, until either a channel supporting registration is selected or the GSM channel list is exhausted. If in step 136 it is determined that all the channels in the list have been exhausted, the mobile device will register, in step 140, for Emergency Service on the network associated with the channel carrying the strongest signal in the GSM channel list. Registration on non-accessible networks for Emergency Service is required for compliance to the GSM standard. A rescan counter is then initialised in step 142.

Though not illustrated in FIGS. 1-4, it is common for mobile devices to initialize a rescan counter if no service is detected at either step 100 or step 102. Thus if there are no channels with signal power in excess of the threshold, or if no channels containing a GSM encoded signal are identified, the rescan counter is set to a predetermined value, such as 30 seconds. Upon expiry of the rescan counter the process restarts at step 100.

As discussed above, it is common for a single cellular station to provide signals on a plurality of channels in the frequency band. The multiple channels used by each cellular station are designed to allow a user to take advantage of noise suppressing technologies such as frequency hopping. To implement frequency hopping, cellular stations typically spread the channels that they utilize over the complete frequency band.

According to an aspect of the present invention, this spreading of service over multiple channels is exploited to provide a method of scanning that reduces scan times. This allows the scans to be performed more frequently if the desire is to allow a mobile device to rapidly acquire a signal, or it allows the scans to be performed at the same intervals previously used to provide reduced battery usage in areas without service.

In one embodiment of the present invention, the mobile device scans only a subset of the channels in the frequency band during each scan. As channels used by a single station are typically spaced apart, if a scan of a subset of the channels in the frequency band does not find a GSM encoded signal, it is statistically likely that there are no GSM encoded signals in any of the channels. In a presently preferred embodiment of the present invention, the next scan is performed on a second subset of the channels in the frequency band. These subsets can be overlapping or disjoint from each other. By scanning only a subset of the channels in each scan the mobile device reduces scan times. When no GSM encoded signals are detected it is likely that no signals are present in the unscanned channels. If a different subset of channels is selected for the subsequent scans, it is possible to use multiple scans to cover all the channels in the frequency band to ensure complete coverage of the channels in the frequency band.

The ensuing description describes a method where the selected subset corresponds with a subset that is half of the channels in the frequency band, and where a second selected subset corresponds to the other half of the channels. In a presently preferred embodiment, one of the subsets corresponds to the even numbered channels in the frequency band, and the other subset corresponds to the odd numbered channels in the frequency band. As will be discussed later, the present invention can be implemented using other subsets.

Figure 5:
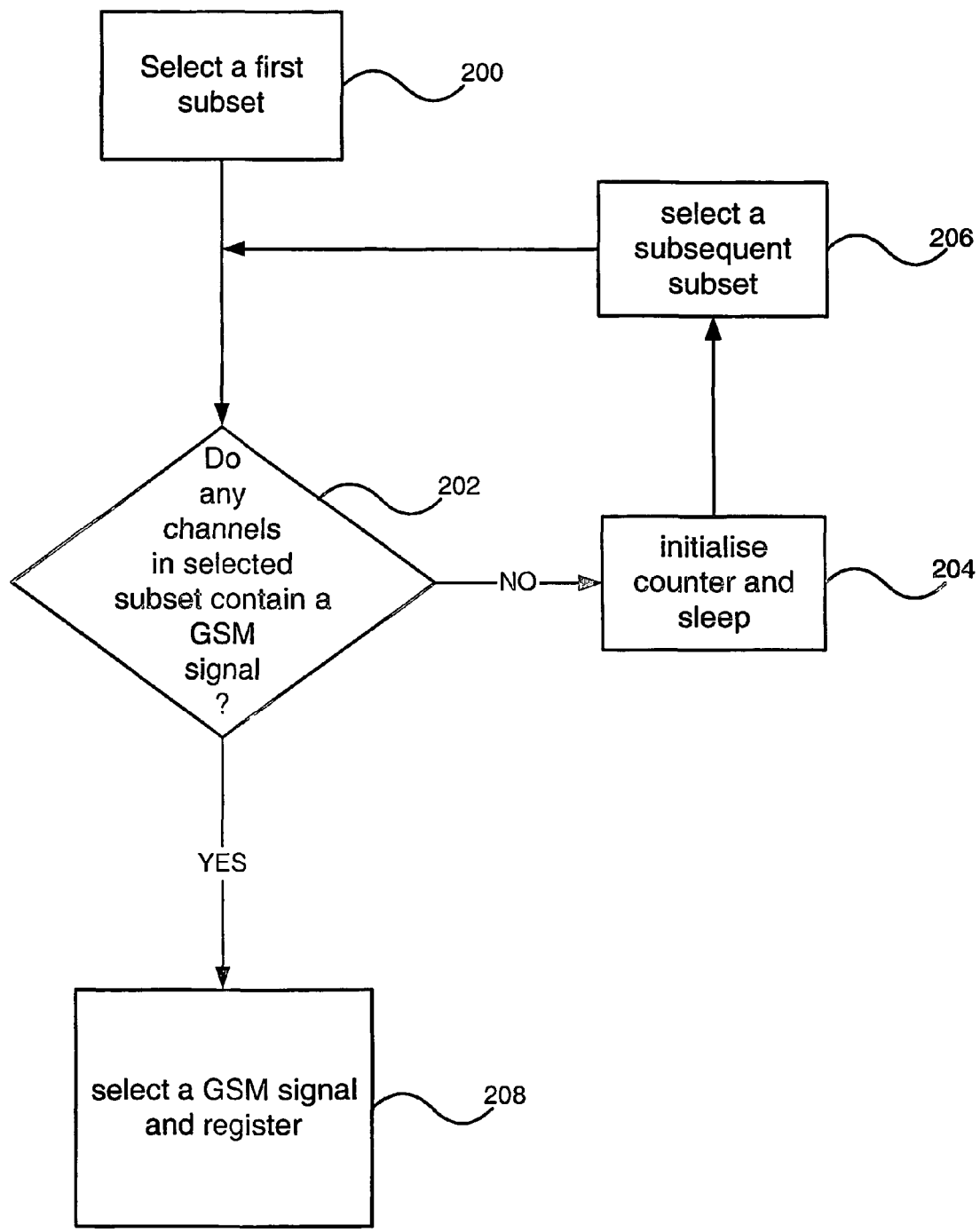
FIG. 5 is a flowchart illustrating a method of building a GSM channel list according to an aspect of the present invention.

A presently preferred embodiment of the method of the present invention is illustrated in the flowchart of FIG. 5. In step 200 the mobile device selects a first subset of channels in the frequency band. In step 202 the channels are scanned to determine if the selected subset contains channels carrying GSM encoded signals. If no GSM encoded signals are detected, the mobile device initializes a rescan counter or timer and enters a power saving sleep mode in step 204. Upon expiry of the timer, the mobile device selects a subsequent subset in step 206, which in a presently preferred embodiment is the complement of the first subset. The subsequently selected subset is then examined to determine if any channel carries GSM signals at step 202. This loop continues until one of the channels in the selected subset is determined to contain a GSM encoded signal. At this time the mobile device will select one of the identified GSM signals and register itself to establish a connection in step 208.

Figure 6:
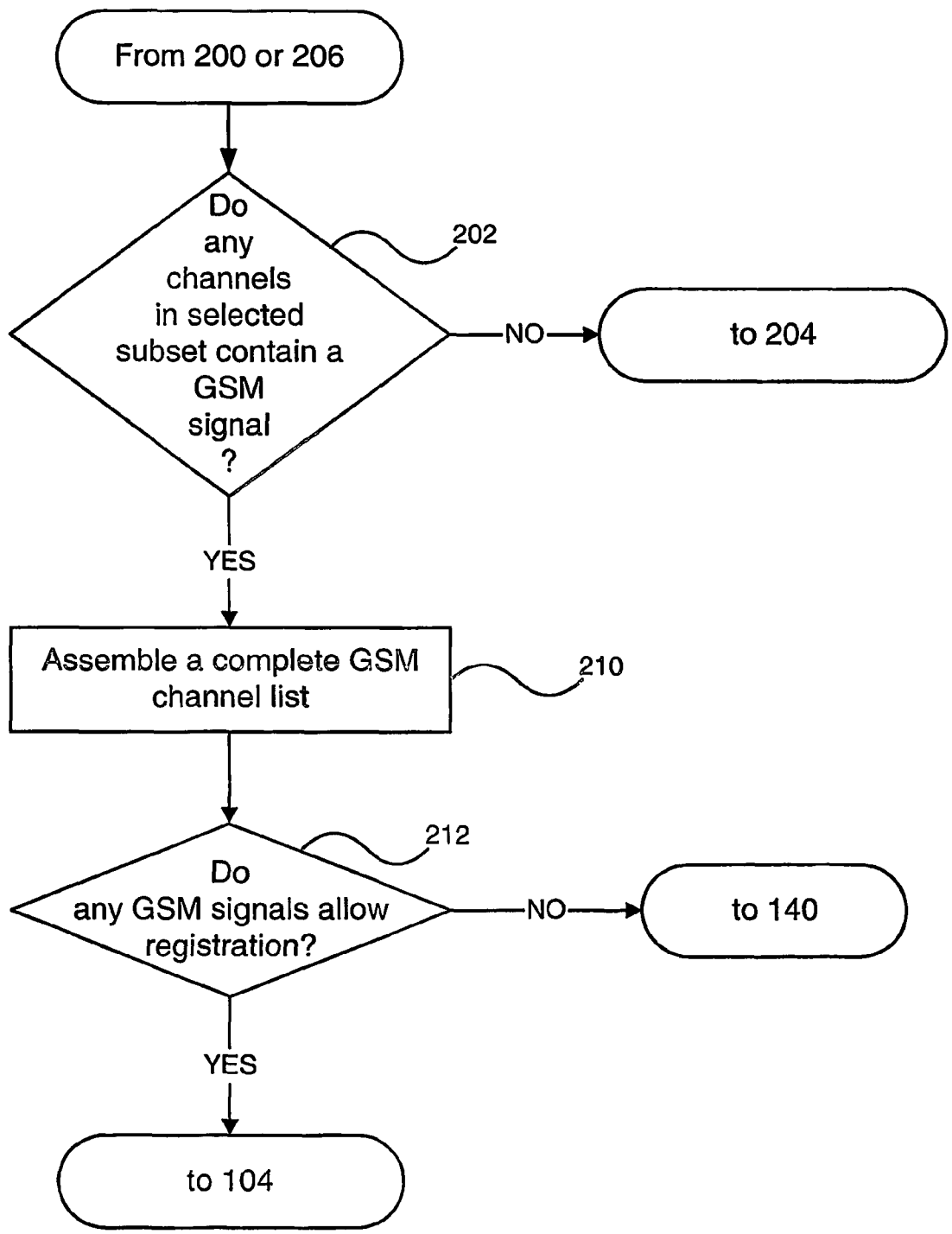
FIG. 6 is a flowchart illustrating an embodiment of the method of the present invention.

If a network provides a mobile device with the registration rights, it is referred to as an accessible network. To ensure compliance with GSM standards, mobile devices typically register themselves to the accessible network associated with the channel carrying the highest power GSM encoded signal. A presently preferred embodiment of the present invention provides a modification to the method of FIG. 5 to implement such a method. As illustrated in the flowchart of FIG. 6, from either step 200 or 206, a determination of whether any channels in the selected subset carries a GSM signal is made in step 202 as before. If no channels carrying GSM encoded signals are identified or detected, the method proceeds to step 204 as previously described. However, if in step 202 a channel carrying a GSM encoded signal is identified, the mobile device assembles a complete GSM channel list in step 210. This can be performed by scanning the complement of the previously scanned subset, or it can be assembled by scanning the entire frequency band. Though it is presently preferred that the complete GSM channel list be assembled in step 210 by scanning the complement of the selected subset, this preference should not be construed as limiting. In step 212, the complete GSM channel list is examined to determine whether a signal carried by a channel in the GSM channel list is associated with an accessible network. If no accessible networks are identified, the mobile device proceeds to step 140 as described earlier, and provides emergency only service. If at least one accessible network is identified, the mobile device proceeds to step 104 where it connects to the accessible network associated with channel carrying the strongest signal.

Figure 7:
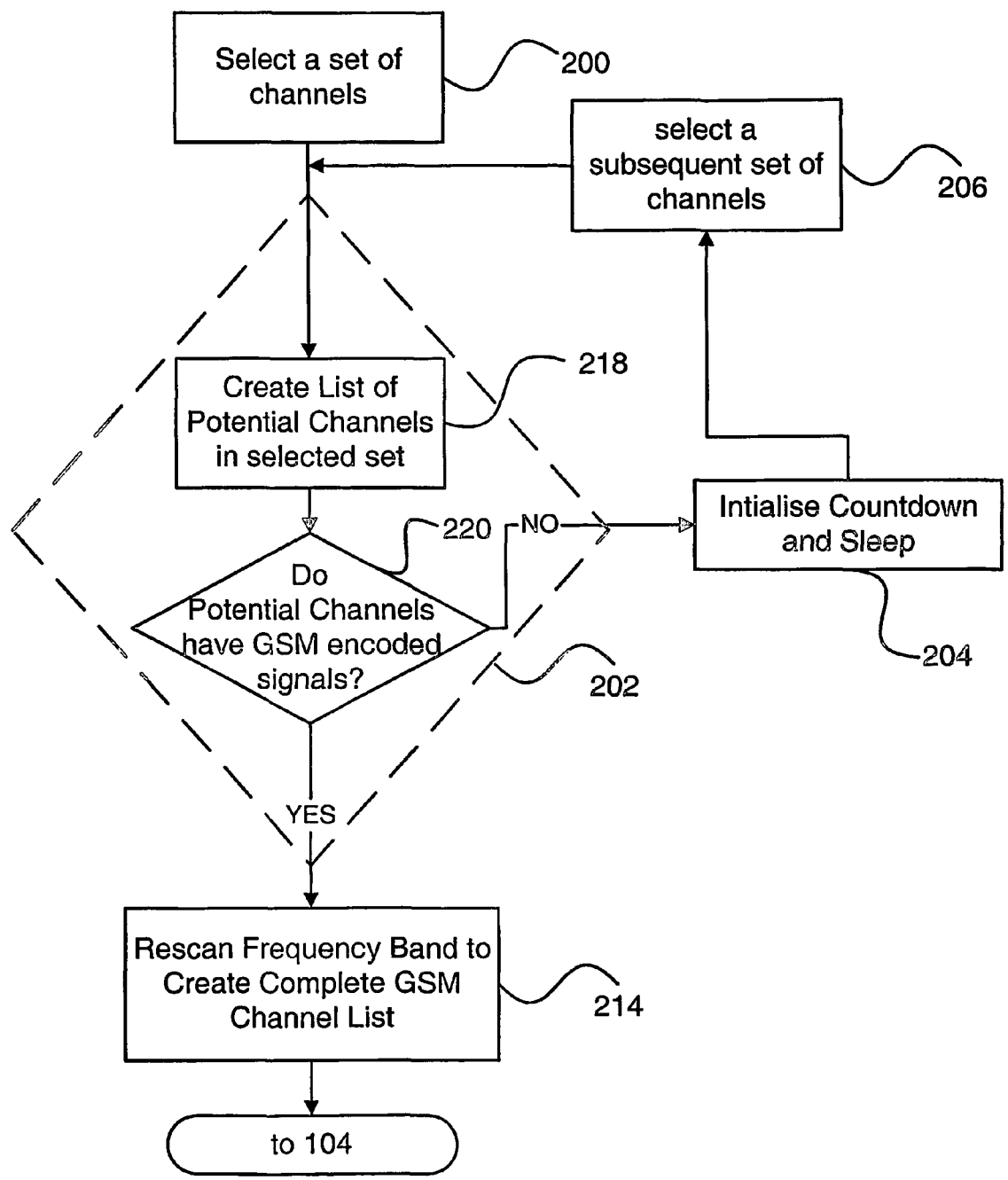
FIG. 7 is a flowchart illustrating a presently preferred embodiment of the present invention.

FIG. 7 illustrates a presently preferred embodiment of the present invention. A subset of channels is selected in step 200. In step 202, the channels in the selected subset are scanned to identify any channels carrying a GSM encoded signal. This scanning and identification is performed by first creating a list of potential channels in step 218 by scanning through the channels in the subset to determine which channels carry a signal with power in excess of a threshold value. The potential channel list is examined in step 220 to determine if any of the entries carry a GSM encoded signal. If no such channels are identified, the process continues to steps 204 and 206 as above. If channels carrying GSM encoded signals are identified, the process proceeds to the assembly of a complete GSM channel list by rescanning the whole frequency band in step 214, or by scanning the complementary subset to determine which of the channels in the complementary subset carry GSM encoded signals. Following the assembly of the complete GSM channel list the mobile device proceeds to step 104 as described above.

The above described methods take advantage of the fact that each GSM station is typically assigned a plurality of channels in which to operate. Typically, the selection of a subset of channels will provide the mobile device with a statistically significant probability of finding a channel in a scan of the subset of channels. By selecting subsequent subsets that are distinct, a series of scans can be used to examine all the channels in the frequency band.

In a presently preferred embodiment, the set of channels in the frequency band is divided into two disjoint subsets, the first corresponding to the even numbered channels, and the other corresponding to the odd numbered channels. In this embodiment, each scan covers half of the channels, and the entire frequency band is scanned every two cycles. As a typical station transmits a signal on a plurality of channels, it is highly probable that it will transmit signals on both even and odd channels. As a result, if a station is within range of the mobile device it is likely that it will be detected with a single scan of one subset. As scanning each subset takes half the time of a full scan, the mobile device can scan as often as a prior art device and consume approximately half the power, while not significantly diminishing the probability of detecting a channel carrying a GSM encoded signal. Additionally, as competing service providers typically provide overlapping service areas, it is likely that there will be more than one station covering a region, further increasing the probability that there will be at least one even and one odd channel in use to transmit GSM encoded signals.

Table 1 illustrates a potential distribution of GSM signals in 255 channels. Three GSM networks: network A, network B, and network C; are each associated with a number of channels carrying GSM encoded signals. In a scan of the first selected subset (the odd numbered channels), the mobile device detects GSM encoded signals carried in channels 3, 125, 127 and 135. A scan of a subsequently selected subset (the even numbered channels) is then performed to obtain a complete GSM channel list. The scan of the subsequently selected subset identifies GSM encoded signals in channels 6, 134, 252, and 254. The first and second scans consume no more time or power than conventional scanning methods. The complete GSM channel list can then be easily assembled and the channel corresponding to an accessible network and carrying the strongest signal can be selected for registration. In the absence of an accessible network, the network associated with the channel carrying the strongest signal is selected for emergency service. In Table 1, X indicates that a channel was scanned and no GSM signal was identified/indicates that a channel was not scanned, and O indicates that a channel was scanned and a GSM signal was identified.

TABLE 1

| Channel | Contents | Scan 1 | Scan 2 |
|---|---|---|---|
| 1 | | X | / |
| 2 | | / | X |
| 3 | GSM network A | O | / |
| 4 | | / | X |
| 5 | | X | / |
| 6 | GSM network A | / | O |
| 7 | | X | / |
| 8 | | / | X |
| ... | | | |
| 124 | | / | X |
| 125 | GSM network A | O | / |
| 126 | | / | X |
| 127 | GSM network B | O | / |
| ... | | | |
| 134 | GSM network B | / | O |
| 135 | GSM network C | O | / |
| 136 | | / | X |
| ... | | | |
| 252 | GSM network C | / | O |
| 253 | | X | / |
| 254 | GSM network B | / | O |
| 255 | | X | / |

Table 2 illustrates how a mobile device implementing a scanning method as described herein can scan as often as in prior art implementations and still realize battery savings. In Table 2, an asterisk indicates that a channel is scanned, while as above/indicates that channel has been skipped. As illustrated, at a first time T1, the prior art method scans each identified channel in the frequency band. In a presently preferred embodiment which segments the frequency band into even and odd sub-bands, only the odd numbered channels are scanned in a first scan. This results in the prior art method scanning 255 channels, compared to only 128 channels for the odd channel first scan embodiment. At a second time T2, the prior art method once again scans all 255 channels in the frequency band, while only the 127 even numbered channels are scanned in a second scan according to this embodiment. Over the course of two scans both methods have scanned every channel, but this embodiment of the present invention has required only 255 scans, while the prior art required 510 scans. This is an effective savings of half the power required to perform the scans. If the mobile device is out of service range for substantial periods of time, the above odd/even scanning method consumes only half the power, thus offering considerable benefit.

TABLE 2

| Channel | T$_1$ Prior Art | T$_1$ Odd/Even Embodiment | T$_2$ Prior Art | T$_2$ Odd/Even Embodiment |
|---|---|---|---|---|
| 1 | * | * | * | / |
| 2 | * | / | * | * |
| 3 | * | * | * | / |
| 4 | * | / | * | * |
| 5 | * | * | * | / |
| 6 | * | / | * | * |
| 7 | * | * | * | / |
| 8 | * | / | * | * |
| 9 | * | * | * | / |
| 10 | * | / | * | * |
| ... | | | | |
| 127 | * | * | * | / |
| 128 | * | / | * | * |
| 129 | * | * | * | / |
| 130 | * | / | * | * |
| ... | | | | |
| 250 | * | / | * | * |
| 251 | * | * | * | / |
| 252 | * | / | * | * |
| 253 | * | * | * | / |
| 254 | * | / | * | * |
| 255 | * | * | * | / |
| Total Scans: | 255 | 128 | 255 | 127 |

Figure 8:
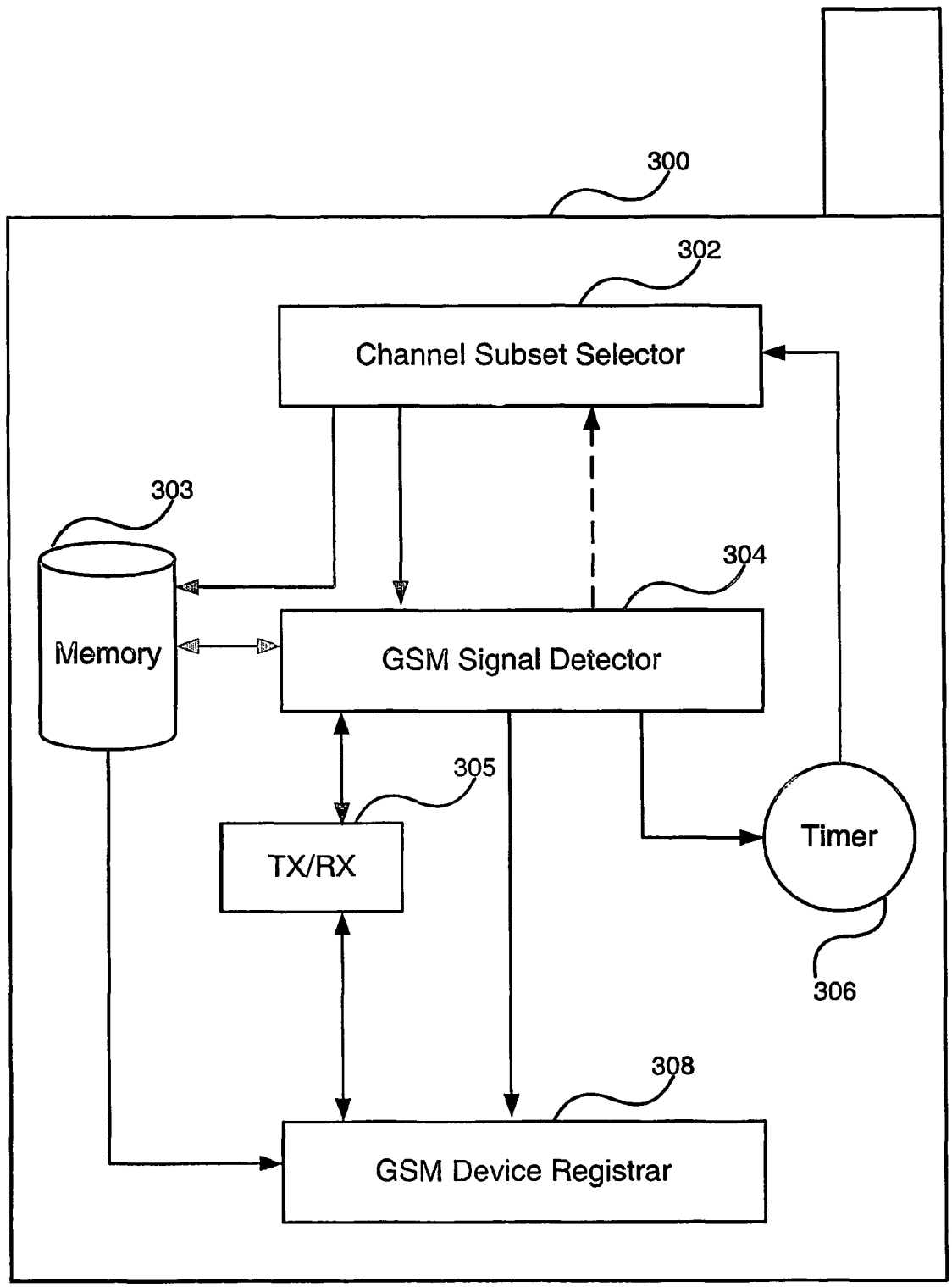
FIG. 8 is an block diagram of a mobile device.

FIG. 8 illustrates a mobile device. Mobile device 300 implements the channel acquisition methods described above and contains channel selector 302 for selecting a subset of the channels in the frequency band to be scanned. In a presently preferred embodiment, the selected subset of channels is selected from a table, though it is fully contemplated that the subset selection can be performed dynamically. The selected subset is stored in memory 303 so that it is accessible to other components of mobile device 300. Channel subset selector 302 controls a signal detector, such as GSM signal detector 304, by providing a subset of the channels in the frequency band for the signal detector to scan. Channel subset selector 302 optionally indicates the location of the selected subset in memory 303, or alternatively, provides the selected subset to GSM signal detector 304. GSM signal detector 304 reads the selected subset from memory 303 and performs a scan of the signals carried by the channels in the selected subset. GSM signal detector 304 performs the scan of the selected subset of channels through communication with transceiver 305. The scans performed by GSM signal detector 304 determine if a channel in the selected subset carries a GSM encoded signal. All such detected signals are stored in memory, either in a new location, or by deleting the non-GSM encoded channels from the list provided by channel subset selector 302. In some embodiments of mobile device 300, GSM signal detector 304 will request a new subset of channels to scan if a GSM encoded signal is detected in a selected subset. Alternatively, GSM signal detector 304 will set timer 306 to start a rescan counter if no GSM encoded signals are detected.

Upon detecting a channel carrying a GSM encoded signal, GSM signal detector 304 assembles a GSM channel list. As described above this list can be assembled by either creating a new list in memory 303, or by deleting entries on the channel list provided by channel subset selector 302 that do not carry GSM encoded signals. This list can be a partial or a complete GSM channel list. The partial GSM channel list identifies the channels in the presently selected subset that carry GSM encoded signals identified in the current scan. The full GSM channel list identifies all channels in the frequency band that carry GSM encoded signals. The GSM channel list is stored in memory 303 or is directly provided to GSM device registrar 308. GSM device registrar 308 utilises transceiver 305 in memory 303 to register with the accessible network having the highest powered signal in a scanned channel, or to register for emergency service with the highest powered signal in a scanned channel if it is determined that none of the networks associated with identified channels are accessible.

Those skilled in the art will appreciate that the elements of mobile device 300 are typically implemented as software elements on hardware platforms. The channel subset selector 302, the GSM signal detector 304, the timer 306, and the GSM device registrar 308 are typically software elements executed by a standard microprocessor with access to a memory, such as memory 303. Transceiver 305 can be implemented as both a software controlled radio and a circuit based design as design requirements dictate.

One skilled in the art will appreciate that channel subset selector 302 can provide overlapping or non-overlapping subsets, it can provide subsets that correspond to either even and odd channel number, or it can provide subsets that represent any fraction of the channels in the frequency band. Additionally, signal detector 304 can be implemented to detect other encoded signals for applicability in other networks such as CDMA based networks, and other networks whose signals are transmitted in channels allocated in a frequency band.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of connecting a mobile device to a network having associated channels, the method comprising:
   scanning a selected subset of the associated channels in a predefined frequency band to create a list of potential channels carrying signals having power in excess of a predetermined threshold;
   identifying channels carrying an encoded signal in the list of potential channels;
   upon identifying no channel in the list of potential channels as carrying the encoded signal:
   initializing a timer;
   upon expiration of the timer, performing the scanning and identifying steps on another subset of associated channels in the predefined frequency band;
   upon identifying at least one channel in the list of potential channels as carrying the encoded signal:
   scanning one or more other subsets of the associated channels, which together with the selected subset of the associated channels comprise the predefined frequency band, to assemble a complete list of potential channels having a power in excess of the predetermined threshold;

identifying channels in the complete list of potential channels that carry the encoded signal; and establishing a connection between the mobile device and the network associated with a channel carrying a strongest signal within the channels identified as carrying the encoded signal.

2. The method of claim 1, wherein the encoded signal is a GSM encoded signal and the network associated with the GSM encoded signal is a GSM network.

3. The method of claim 1, including steps of:

initialising a timer after scanning the selected subset when the step of analyzing fails to identify channels carrying the encoded signal; and waiting until expiry of the timer before scanning a next selected subset.

4. The method of claim 1, wherein the one or more other subsets is distinct from the selected subset.

5. The method of claim 4, wherein the more or more other subsets is complementary to the selected subset.

6. The method of claim 1 wherein the step of establishing the connection includes registering the mobile device to the network with an associated encoded signal having the strongest power.

7. The method of claim 1 wherein the step of establishing the connection includes the step of registering the mobile device for emergency service to the network with an associated encoded signal having the strongest power.

8. The method of claim 1, wherein the selected subset of the associated channels corresponds to even numbered channels in a frequency band, and the one or more other subsets of the associated channels correspond to odd numbered channels in the frequency band.

9. A mobile device for connecting to an accessible wireless network transmitting an encoded signal in at least one of a plurality of channels in a frequency band, the mobile device comprising:

a transceiver for scanning channels in the frequency band;

a channel subset selector for selecting a subset of the channels in the frequency band and for controlling the transceiver to scan the channels in the selected subset to create a list of potential channels carrying signals having power in excess of a predetermined threshold;

an encoded signal detector for identifying channels in the list of potential channels;

a timer, the timer being initialized upon identifying no channel in the list of potential channels as carrying the encoded signal;

upon expiration of the timer, the channel subset selector selecting another subset of associated channels in the predefined frequency band and controlling the transceiver to scan the another subset to create the list of potential channels carrying signals having power in excess of the predetermined threshold;

upon the encoded signal detector identifying at least one channel in the list of potential channels as carrying the encoded signal:

the channel subset selector controlling the transceiver to scan one or more other subsets of the associated channels, which together with the selected subset of the associated channels comprise the predefined frequency band, to assemble a complete list of potential channels having a power in excess of the predetermined threshold;

the encoded signal detector identifying channels in the complete list of potential channels that carry the encoded signal; and, a network device registrar for registering the mobile device on the accessible network associated with a channel carrying a strongest signal within the channels identified as carrying the encoded signal.

10. The mobile device of claim 9, further including a timer for initiating a delay if the encoded signal detector does not detect the encoded signal in the subset of the channels, and for instructing the channel subset selector to select a subsequent subset of the channels upon expiry of the delay.

11. The mobile device of claim 10, wherein the timer includes means for instructing the channel selector to select the one or more subsets of the channels upon expiry of the delay if the encoded signal detector did not identify a channel carrying the encoded signal.

12. The mobile device of claim 9, wherein the accessible wireless network transmits a GSM encoded signal, and the encoded signal detector is a GSM signal detector.

13. The mobile device of claim 9, wherein the encoded signal detector includes means for requesting a complementary subset of the channels when a channel carrying an encoded signal is identified.

14. The mobile device of claim 9, wherein the encoded signal detector includes means for requesting a complete subset of the channels when a channel carrying an encoded signal is identified.

15. The mobile device of claim 9, wherein the network device registrar includes means for registering the mobile device on the accessible network associated with the identified channel carrying the highest power encoded signal.

16. The mobile device of claim 9, wherein the network device registrar includes means for registering the mobile device on the network associated with the identified channel carrying the highest power encoded signal.

* * * * *